United States Patent [19]

Wagner et al.

[11] E Patent Number: Re. 32,008

[45] Reissued Date of Patent: Oct. 22, 1985

[54] PROCESS FOR MANUFACTURING PLASTICALLY DEFORMED LIGHT METAL OBJECTS HAVING A CONNECTOR PART OF A DIFFERENT METAL

[75] Inventors: Alfred Wagner, Steisslingen; Adolf Ames, Hilzingen; Ulf Hodel, Engen, all of Fed. Rep. of Germany

[73] Assignee: Swiss Aluminium Ltd., Chippis, Switzerland

[21] Appl. No.: 679,400

[22] Filed: Dec. 7, 1984

Related U.S. Patent Documents

Reissue of:

[64] Patent No.: 4,397,413
Issued: Aug. 9, 1983
Appl. No.: 256,292
Filed: Apr. 22, 1981

[30] Foreign Application Priority Data

May 3, 1980 [DE] Fed. Rep. of Germany ..... 3017106

[51] Int. Cl.[4] ..... B23K 28/00

[52] U.S. Cl. ..... 228/155; 228/176; 72/256

[58] Field of Search ..... 228/155, 115, 116, 117, 228/176; 72/256; 188/322.19

[56] References Cited

U.S. PATENT DOCUMENTS

| | | | |
|---|---|---|---|
| 2,986,273 | 5/1961 | Bardgett | 72/258 |
| 3,041,718 | 7/1962 | Stuchbery | 228/265 |
| 3,222,761 | 12/1965 | Sabo | 72/256 |
| 3,648,353 | 3/1972 | Anderson | 228/115 |
| 3,893,550 | 7/1975 | De La Rosa | 188/322.19 |
| 4,214,469 | 7/1980 | Wagner et al. | 72/256 |
| 4,342,211 | 8/1982 | Wagner et al. | 72/256 |

*Primary Examiner*—Kenneth J. Ramsey
*Attorney, Agent, or Firm*—Bachman & LaPointe

[57] ABSTRACT

Manufacture of a light metal shock absorber by impact extrusion of the light metal of a steel-light metal composite blank, wherein the metallic bonding of the composite blank is achieved by coextrusion. The steel component on the bottom face of the light metal shock absorber is provided with a steel ring which is welded or otherwise appropriately joined during or after impact extrusion. Also the light metal sleeve of the shock absorber can, after impact extrusion, be welded or otherwise appropriately joined to light metal.

8 Claims, 4 Drawing Figures

PROCESS FOR MANUFACTURING PLASTICALLY DEFORMED LIGHT METAL OBJECTS HAVING A CONNECTOR PART OF A DIFFERENT METAL

Matter enclosed in heavy brackets [ ] appears in the original patent but forms no part of this reissue specification; matter printed in italics indicates the additions made by reissue.

BACKGROUND OF THE INVENTION

The invention relates to a method for manufacturing light metal objects which are shaped plastically in the solid state and which, before use, are joined securely to parts or objects made of steel or another metal. The present invention also relates to a shaped body with a light metal part in particular in the form of a hollow body which is connected to a steel part or object of an appropriate metal.

Light metal cylinders which are employed for example as shockabsorber sleeves are usually joined to a lower steel part by means of a flanged edge which is made during the production of the cylinder and into which the steel part is introduced and clamped in place. Such a connection to however between two steel parts to is disclosed for example in U.S. Pat. No. 2,891,525.

The method used to date to manufacture the shaped part mentioned at the start is however very disadvantageous as the connection between two different metals is not sufficiently reliable and requires several steps to make it.

In view of the foregoing it is a principal object of the present invention to eliminate the known shortcomings and to make a process which is simpler and less expensive to use. In addition the quality of the shaped part is improved.

SUMMARY OF THE INVENTION

The foregoing object is achieved by way of the present invention wherein, in the course of production, the light metal is connected by metallic bonding to steel or the like by means of coextrusion and, in a subsequent step in the process, at least the light metal component of a composite blank or length of the resultant composite section is deformed. In connection with this it has been found favorable to weld or appropriately join the steel component/components or parts to the composite component made of steel or the like metal, after the deformation of the composite blank.

Due to the proposed method, the manufacture for example of a light metal shock absorber sleeve with steel base need no longer be a special process step and the steel part then joined to the sleeve by flanging on with a special edge piece. Instead, and with the saving of at least one step in the manufacturing process, one single blank is made from two components which are metallically bonded and this blank appropriately shaped into the required form. A steel component, in the case of the shock absorber sleeve its mounting ring, can then be immediately welded onto the steel part.

The result achieved with simplified method of manufacture is therefore a high grade product that is, a shaped body according to the invention which has its light metal part metallically bonded by coextrusion to the steel part or a part made of another suitable material. Loosening of the steel part, as was possible for example with conventional flanged-on shock absorber sleeves, is now eliminated.

Another feature of the process according to the present invention is that the shaping of the composite blank takes place by the generally known method of impact extrusion.

In manufacturing the above mentioned shock absorber sleeves or similar shaped bodies it has been found particularly favorable to extrude the composite section in the form of a strip-shaped steel component and a light metal component, the thickness of which is much greater than the thickness of the steel part in order to enable the light metal to be shaped into relatively tall cylinders or otherwise shaped parts. Usefully, if desired, the light metal component is then deformed until its thickness is about the same as that of the steel strip. The light metal cylinder is therefore provided with a thin light metal base which is metallically bonded to the steel part.

The production of shock absorber sleeves by the process according to the present invention is given prominence here as such sleeves represent a very suitable example. Of course, other shaped parts made of at least two components of different metals also lie within the scope of the present invention.

The invention embraces not only shaped parts in which the light metal part of them is shaped by deformation and the steel part remains unchanged but it is also very possible to arrange for the steel part to be given a special cross-sectional shape without the metallic bonding between the two components parts suffering. A marked degree of simplification is therefore achieved in the manufacture of plastically deformed light metal parts or objects which have to be joined to steel in their application, such as is the case in the example with the shock absorber sleeve which involves subsequent welding on of the mounting ring, and this in particular where the light metal in the said part or objects is aluminum or an aluminum alloy.

BRIEF DESCRIPTION OF THE DRAWINGS

Further advantages, features and details of the present invention are revealed in the following description of preferred exemplified embodiments and with the help of the drawings wherein.

DETAILED DESCRIPTION

Figure 1:
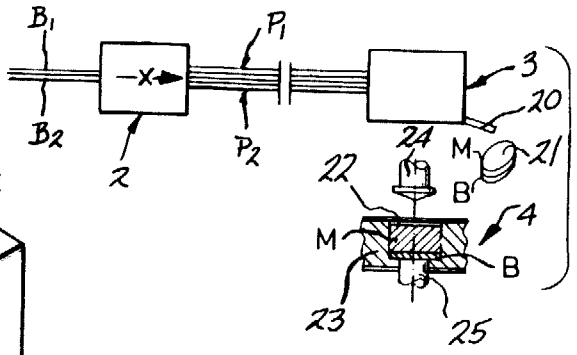
FIG. 1: A schematic drawing of equipment according to the invention.

Equipment for manufacturing shock absorber sleeves or the like (see FIG. 3) is, as shown in FIG. 1, made up of an extrusion press part 2, a stamping part 3 which follows in the direction of extrusion x, and a subsequent impacting part 4.

Figure 2:
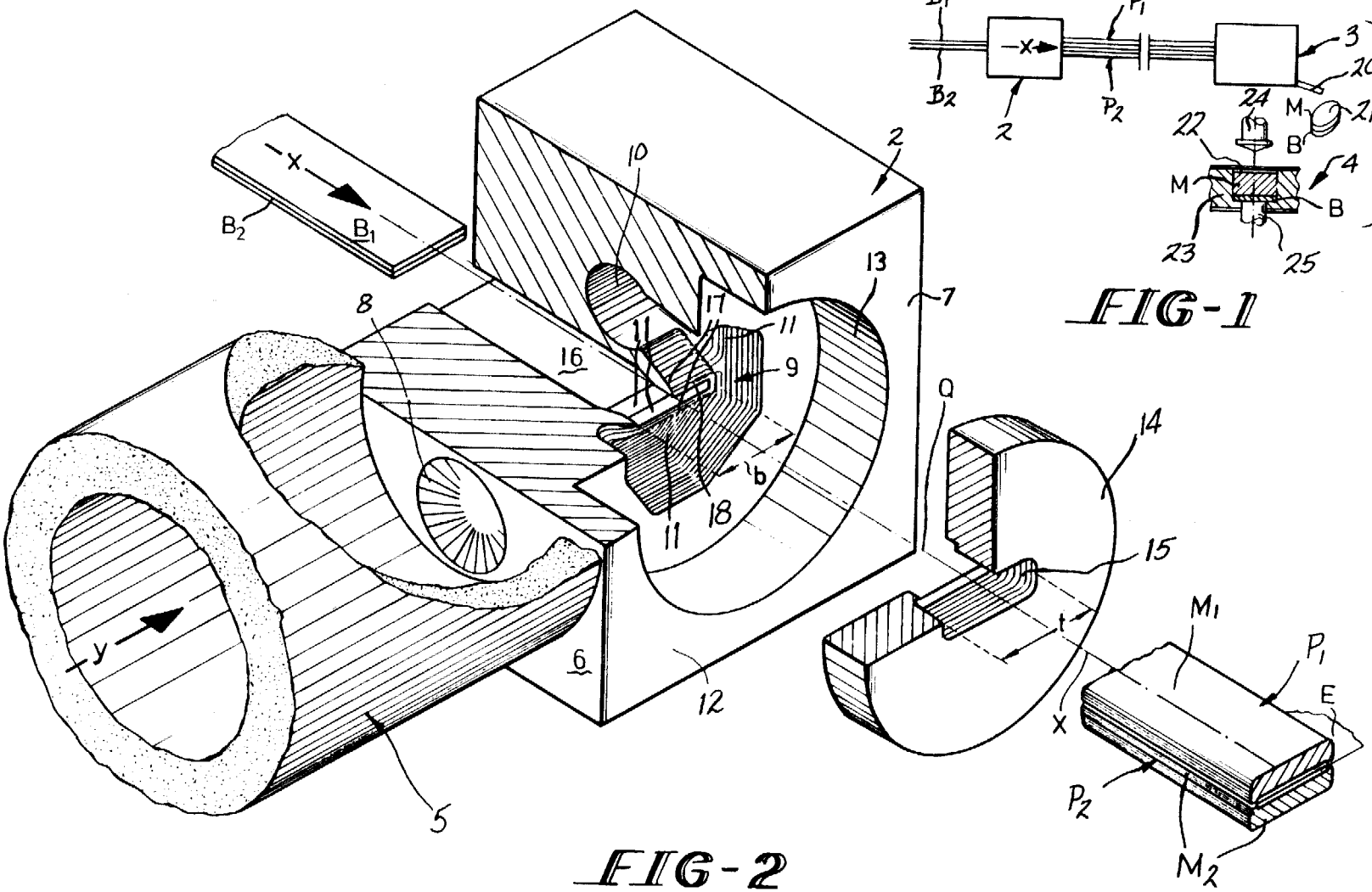
FIG. 2: A sectioned perspective view of a—compared with FIG. 1—enlarged detail of another version with parts removed.

Neighboring on to a magazine 5 is face 6 of an extrusion die block 7 of an extrusion press part 2; in this face 6 are, as shown in FIG. 2, approximately oval inlets 8 for the matrix which is produced from an aluminum billet, not shown here, during the extrusion process. The inlet openings 8 taper down in the direction y in a trumpet-like shape to end in a pre-die chamber 9 in the die block 7 as matrix channel 10. In this chamber 9 the matrix metal is fed towards and deflected by a shear face 11.

A side face 12 of the die block 7, parallel to the direction of metal feed y, features a recess 13 to accommodate an extrusion facility or die 14. This in turn features an approximately oval die opening or shape-giving orifice 15.

The main axis of the die orifice 15 conicides with the longitudinal axis Q of a feed channel 16 for two superimposed steel strips $B_1$, $B_2$ whereby axis Q crosses the direction of metal feed y. These steel strips are fed through the feed channel 16 in direction x and emerge from the same via a tapered slit 18 of width b in mandrel 17 into the die chamber 17 from which they pass on into the die orifice 15 enclosed in matrix metal. Two composite sections $P_1$, $P_2$ are formed in the die orifice 15. Each of these comprises a strip $B_1$ or $B_2$, and a supporting section $M_1$ or $M_2$ shaped out of matrix metal.

The width b of the tapered slit 18—and the breadth of the strips $B_1$, $B_2$ fed into it—correspond here to about the width t of the die orifice 15 so that the matrix metal is uninterrupted at the dividing plane E between the two strips $B_1$, $B_2$.

Figures 3, 4:
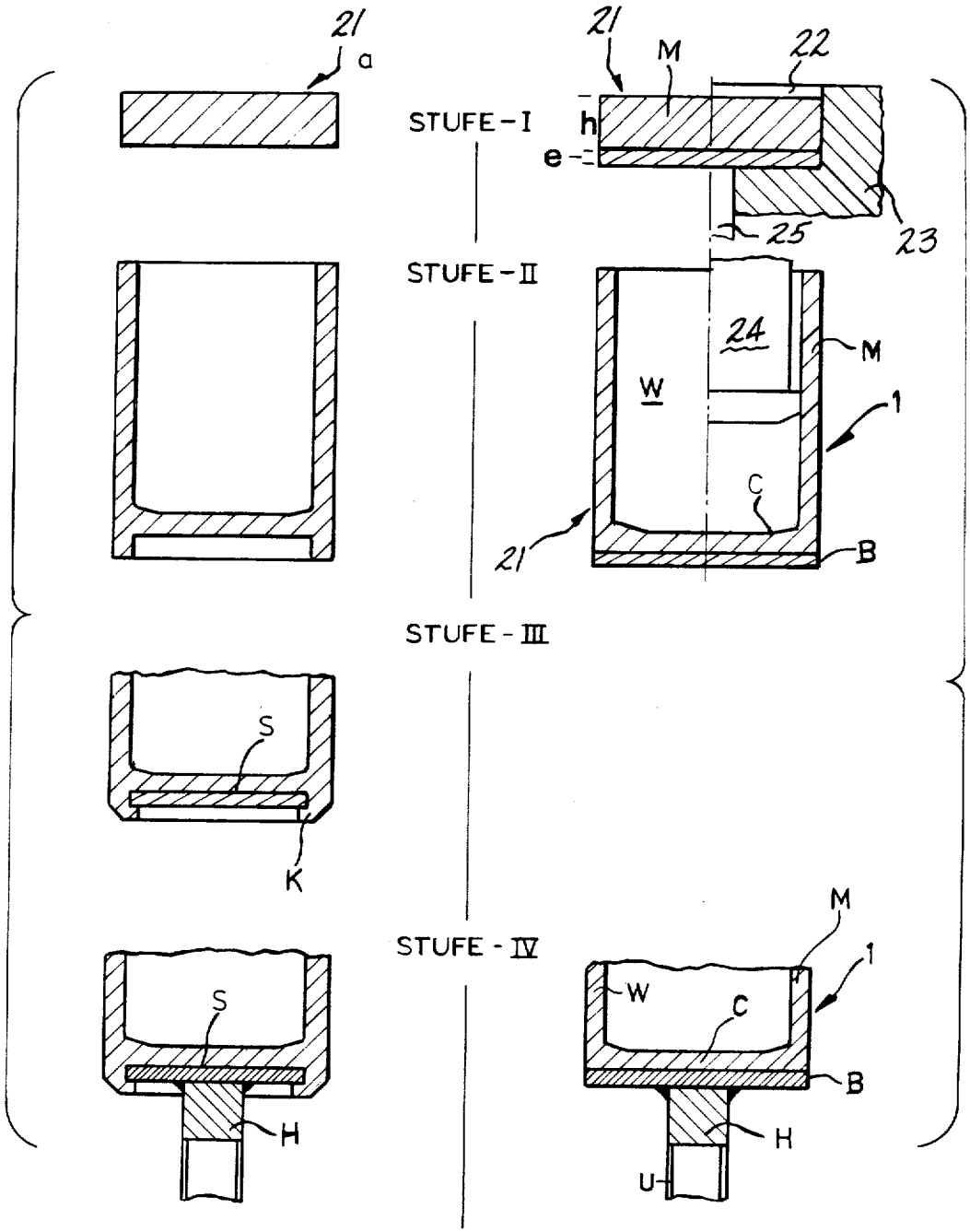
FIG. 3: A schematic description of the steps in a part of the equipment shown in FIG. 1 in the process of manufacturing an exemplary shock absorber sleeve.
FIG. 4: The steps involved in manufacturing conventional shock absorber sleeves.

After the extrusion part 2, the composite sections $P_1$, $P_2$ enter the stamping or shearing part 3—the individual components of which (cutting tool, backer) are not shown here. The blanks 21 of two metallically bonded layers viz., steel strip B of thickness e and aluminum part M, leave part 3 via chute 20 and enter the receptacle/recepticles 22 of the impact extrusion press block 23. The composite blank 21 is placed, with aluminum layer M upwards, in recepticle 22 (stage I in FIG. 3) at a level i and then deformed by a punch 24 (stage II). The right half of the drawings in FIG. 3 shows the facilities also shown in FIG. 1: the left hand side shows only the shape of the blank at the various stages i.e. the shaping facilities have been omitted in the latter case. Stage II in FIG. 3 shows the shape of the finished shock absorber sleeve 1, which is made up of the steel plate B, metallically bonded to sleeve base C, and sleeve wall W.

The finished sleeves 1 are pushed out of the recepticles 22 by ejector 25; later, in stage IV in FIG. 3, an attachment H with ring U is welded on to steel plate B.

The all-aluminum blank of the older type as shown in FIG. 4 is likewise deformed in stage II by impact extrusion so that it is given an approximately H-shaped cross section. The upper part serves a shock absorber sleeve; the lower part in stage III (which of course is missing in FIG. 3) is fitted with a steel plate S which is clamped to the sleeve by flanging over the lower strut K. The mounting attachment H is likewise welded on in stage IV.

The shaping of the composite blank 21 was shown in the drawing to be made by the known method of backwards impact extrusion; of course other methods of shaping can be used, for example forwards or even transverse extrusion.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for manufacturing deep drawn plastically deformed light metal objects having a light metal component joined securely to a heavy metal component comprising the steps of:

supplying a light metal component to an extrusion die;

supplying a heavy metal component to said die for extrusion along with said light metal component whereby said heavy metal component is joined to said light metal component during the extrusion; and

[deep drawing] *impact extruding* said light metal component while said heavy metal component remains joined to said light metal component.

2. A process according to claim 1 including the step of supplying two heavy metal components in face to face contact with each other and with their other respective faces contacting said light metal component whereby each of said heavy metal component is joined to said light metal component during the extrusion but not to each other.

3. A process according to claim 1 further including the steps of joining said heavy metal component of the [deep drawn] *impact extruded* object to another metal component.

4. A process according to claim 1 further including the steps of joining said light metal component of the [deep drawn] *impact extruded* object to another metal component.

5. A process according to claim 1 wherein said light metal component is [drawn] *extruded* into a sleeve-like cylinder.

6. A process according to claim 1 wherein said heavy metal component is steel and said light metal component is aluminum.

7. A process according to claim 1 wherein said light metal component prior to [deep drawing] *impact extruding* is thicker than said heavy metal component.

8. A process according to claim 7 wherein said light metal component is [deep drawn] *impact extruded* until its thickness is about equal to the thickness of said heavy metal component.

* * * * *

UNITED STATES PATENT AND TRADEMARK OFFICE

CERTIFICATE OF CORRECTION

PATENT NO. : Re. 32,008

DATED : October 22, 1985

INVENTOR(S) : Alfred Wagner et al.

It is certified that error appears in the above-identified patent and that said Letters Patent are hereby corrected as shown below:

Column 4, line 13, claim 1, the words "deep drawn" should appear in brackets.

Signed and Sealed this

*Thirty-first* Day of *December 1985*

[SEAL]

*Attest:*

DONALD J. QUIGG

*Attesting Officer*

*Commissioner of Patents and Trademarks*